US011336750B1

(12) United States Patent
Potnuru

(10) Patent No.: US 11,336,750 B1
(45) Date of Patent: May 17, 2022

(54) REMOTE PROCEDURE CALLS THAT OFFLOAD SEARCH PATTERN MATCHING FROM CLIENTS TO SERVERS

(71) Applicant: EMC IP Holding Company LLC, Hopkinton, MA (US)

(72) Inventor: Lokanadham Potnuru, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/436,740

(22) Filed: Jun. 10, 2019

(51) Int. Cl.
*G06F 15/16* (2006.01)
*H04L 67/133* (2022.01)
*G06F 16/953* (2019.01)
*H04L 67/01* (2022.01)

(52) U.S. Cl.
CPC .......... *H04L 67/40* (2013.01); *G06F 16/953* (2019.01); *H04L 67/42* (2013.01)

(58) Field of Classification Search
CPC ........ H04L 67/40; H04L 67/42; G06F 16/953
USPC ................................................. 709/200, 203
See application file for complete search history.

(56) References Cited

U.S. PATENT DOCUMENTS

| 6,496,850 | B1 * | 12/2002 | Bowman-Amuah | G06F 9/4493 709/203 |
|---|---|---|---|---|
| 6,502,213 | B1 * | 12/2002 | Bowman-Amuah | G06F 9/4492 714/49 |
| 6,578,068 | B1 * | 6/2003 | Bowman-Amuah | G06F 9/465 709/203 |
| 6,615,199 | B1 * | 9/2003 | Bowman-Amuah | G06F 9/449 706/50 |
| 6,640,238 | B1 * | 10/2003 | Bowman-Amuah | G06F 9/541 709/201 |
| 6,640,244 | B1 * | 10/2003 | Bowman-Amuah | G06F 9/466 707/999.01 |
| 6,640,249 | B1 * | 10/2003 | Bowman-Amuah | G06F 8/36 709/228 |
| 7,117,504 | B2 * | 10/2006 | Smith | G06F 8/20 719/328 |
| 7,289,964 | B1 * | 10/2007 | Bowman-Amuah | G06F 9/5038 705/1.1 |
| 7,315,903 | B1 * | 1/2008 | Bowden | H04L 41/0886 709/224 |
| 7,599,988 | B2 * | 10/2009 | Frank | G06F 16/9537 709/203 |

(Continued)

*Primary Examiner* — Thu Ha T Nguyen
(74) *Attorney, Agent, or Firm* — Dergosits & Noah LLP; Todd A. Noah

(57) ABSTRACT

A system enables client to convert a command, which specifies applying a search pattern to a data object that is stored by server, into a remote procedure call, which specifies applying the search pattern to the data object that is stored by server, and to use a network connection between client and server to send the remote procedure call to server, in response to receiving the command. The system reads the data object from server, in response to receiving the remote procedure call. The system generates a match result by applying the search pattern to the data object. The system uses the network connection between client and server to send the match result to client as a part of a response to the remote procedure call, thereby enabling client to convert the response to the remote procedure call into a response, which comprises the match result, to the command.

18 Claims, 3 Drawing Sheets

(56) References Cited

U.S. PATENT DOCUMENTS

| | | | |
|---|---|---|---|
| 8,055,913 B2* | 11/2011 | Ginter | G06Q 20/24 713/194 |
| 10,320,632 B1* | 6/2019 | McClintock | H04L 43/045 |
| 10,489,375 B1* | 11/2019 | McClintock | G06F 16/2365 |
| 2002/0129277 A1* | 9/2002 | Caccavale | G06F 21/562 726/24 |
| 2004/0006562 A1* | 1/2004 | Wagner | G06F 16/93 |
| 2005/0240943 A1* | 10/2005 | Smith | G06F 9/465 719/328 |
| 2006/0053491 A1* | 3/2006 | Khuti | H04L 63/1416 726/23 |
| 2007/0150329 A1* | 6/2007 | Brook | G06Q 10/0875 705/7.13 |
| 2008/0222734 A1* | 9/2008 | Redlich | H04L 63/02 726/26 |
| 2008/0229415 A1* | 9/2008 | Kapoor | H04L 63/14 726/22 |
| 2008/0262990 A1* | 10/2008 | Kapoor | H04L 63/1408 706/20 |
| 2009/0006337 A1* | 1/2009 | Cheung | G06F 16/785 |
| 2009/0248699 A1* | 10/2009 | Alvarez | H04L 67/1097 |
| 2010/0138485 A1* | 6/2010 | Chow | H04L 67/42 709/203 |
| 2011/0179007 A1* | 7/2011 | Shi | G06F 16/958 707/706 |
| 2011/0231510 A1* | 9/2011 | Korsunsky | G06F 21/55 709/213 |
| 2011/0231564 A1* | 9/2011 | Korsunsky | H04L 63/1483 709/231 |
| 2012/0240185 A1* | 9/2012 | Kapoor | H04L 63/20 726/1 |
| 2016/0098390 A1* | 4/2016 | Kitajima | G06F 40/205 707/722 |
| 2016/0098646 A1* | 4/2016 | Gomez | G06N 20/00 706/12 |
| 2016/0173648 A1* | 6/2016 | De Angelis | H04L 67/42 709/203 |
| 2016/0196587 A1* | 7/2016 | Eder | G06Q 30/0276 705/14.49 |
| 2018/0109563 A1* | 4/2018 | Stainback | H04L 65/105 |
| 2019/0272296 A1* | 9/2019 | Prakash | G06F 16/90335 |
| 2020/0151206 A1* | 5/2020 | Balakavi | G06F 16/338 |
| 2020/0349672 A1* | 11/2020 | Cochran | G06T 19/20 |
| 2021/0019309 A1* | 1/2021 | Yadav | G06F 16/245 |
| 2021/0065379 A1* | 3/2021 | Zhang | G06F 9/3877 |

\* cited by examiner

REMOTE PROCEDURE CALLS THAT OFFLOAD SEARCH PATTERN MATCHING FROM CLIENTS TO SERVERS

BACKGROUND

A client can use commands, such as grep, find, awk, sed, vi, lex, expr, to apply client-specified search patterns, such as regex (regular expressions), to a client-specified data object, such as a file or a directory, that is stored by a server. In response to such commands, access protocols read the client-specified data object from a network access server over a network, and then the search pattern matching job is executed on the client or on multiple distributed clients. Each such command requires a network access server to read the client-specified data object and its attributes, and then to use a significant amount of network bandwidth by transmitting the entire client-specified data object and its attributes to the client. For example, a client receives a command to apply the search pattern "error or failure" to a 100 Gigabyte file stored by a network access server, access protocols read the 100 Gigabyte file from the network access server over a network, and then the client executes the search pattern matching job to identify the search pattern "error or failure" only once in the fetched 100 Gigabyte file. In another example, a client receives the file access command find-maxdepth 1-type f-mtime 50 to identify the files in the directories of a network access server that were modified during the last 50 days, access protocols read all of the metadata for the directories' files from the network access server over a network, and then the client executes the search pattern matching job to identify files that were modified in the last 50 days in all of the metadata for the directories' files. In each example, the cost of reading a significant amount of data or metadata over a network may be expensive, which may be even more expensive when data and/or metadata is read from a cloud computing platform.

DETAILED DESCRIPTION

Figure 1:
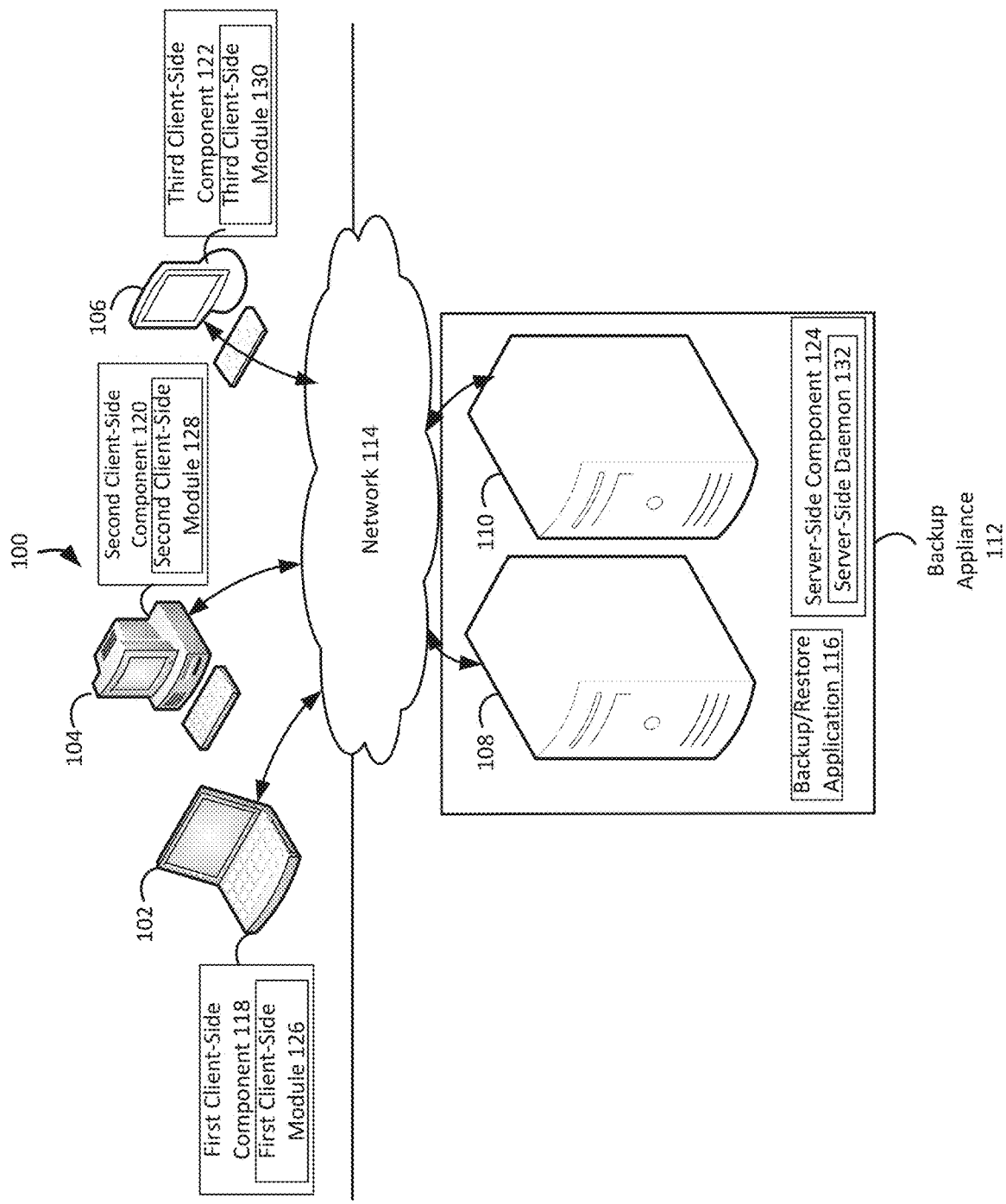
FIG. 1 illustrates a block diagram of an example system for remote procedure calls that offload search pattern matching from clients to servers, under an embodiment.

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

Distributed deduplication is a technology that uses client-side code and server-side code to deduplicate copies of user data objects both at the client, where the user data objects originated, and at the backup server, where the copies of the user data objects are stored. A backup/restore application calls the client-side code for distributed deduplication, which makes a network transmission control protocol (TCP) connection to the backup server and uses this network connection while making calls to the backup server. These calls from the client to the backup server invoke remote procedure calls which send copies of the user data object from the client to the backup server, with the client-side code and the server-side code together performing distributed deduplication of the copies of the user data object before the copies of the user data object are stored persistently on the backup server.

Embodiments herein provide remote procedure calls that offload search pattern matching from clients to servers. A system enables a client to convert a command, which specifies applying a search pattern to a data object that is stored by a server, into a remote procedure call, which specifies applying the search pattern to the data object that is stored by the server, and to use a network connection between the client and the server to send the remote procedure call to the server, in response to receiving the command. The system reads the data object from the server, in response to receiving the remote procedure call. The system generates a match result by applying the search pattern to the data object. The system uses the network connection between the client and the server to send the match result to the client as a part of a response to the remote procedure call, thereby enabling the client to convert the response to the remote procedure call into a response, which comprises the match result, to the command.

For example, a Data Domain® client has a Data Domain® Boost plug-in that receives a grep command to apply the regular expression search pattern "error" to the file file.txt that is stored by a Data Domain® Boost server. The Data Domain® Boost plug-in converts the grep command into a grep remote procedure call that specifies applying the regular expression search pattern "error" to the file file.txt that is stored by the Data Domain® Boost server. The Data Domain® Boost plug-in uses a network connection between the Data Domain® Boost client and the Data Domain® Boost server to send the converted grep remote procedure call to the Data Domain® Boost server. A daemon on the Data Domain® Boost server receives the converted grep remote procedure call from the Data Domain® Boost plug-in via the network connection. The Data Domain® Boost daemon reads the file file.txt from the Data Domain® Boost server. The Data Domain® Boost daemon generates an error in file.txt match result by applying the regular expression search pattern "error" to the file file.txt. The Data Domain® Boost daemon uses the network connection to send the error in file.txt match result to the Data Domain® Boost client as a part of a response to the converted grep remote procedure call. The Data Domain® Boost plug-in receives the error in file.txt match result as an error in file.txt response to the converted grep remote procedure call from the Data Domain® Boost server-side daemon via the network connection. The Data Domain® Boost plug-in converts the error in file.txt response to the converted grep remote procedure call into an error in file.txt response to the original grep command. In contrast to the conventional method of a client executing a search pattern matching job, which creates the technical problem of wasting network bandwidth while transmitting the entire client-specified data object and its attributes to the client, the converted remote procedure call conserves system resources by offloading the search pattern matching to the server, which results in the technical solution of transmitting only the relatively small remote procedure call response, which includes the match result, to the client.

FIG. 1 illustrates a block diagram of a system that implements remote procedure calls that offload search pattern matching from clients to servers, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108 and a second server 110 that may be provided by a hosting company and that may be part of a backup appliance 112, which is a type of data storage device/equipment that accumulates backup software and hardware components within a single device. The clients 102-106, the servers 108-110, and/or the backup appliance 112 can communicate via a network 114. Although FIG. 1 depicts the first client 102 as a laptop computer 102, the second client 104 as a personal computer 104, and the third client 106 as an Apple® Macintosh computer 106, each of the clients 102-106 may be any type of computer, such as a server. Any combination of the servers 108-110 may be any combination of physical computers and virtual machines, or virtual servers. Any combination of the servers 108-110 may be any combination of network access servers, which can be a host computer in an interconnected system that runs computer programs that share their resources or services with client devices.

Any of the clients 102-106 and the first server 108 may include all or part of a backup/restore application 116. Therefore, any of the clients 102-106 may be configured as an EMC Corporation's Data Domain® client. The first server 108, which may be referred to as the backup server 108, may be configured as an EMC Corporation's Data Domain® server 108. The Data Domain® operating system delivers scalable, high-speed, and cloud-enabled protection storage for backup, archive, and disaster recovery.

Data Domain® employs variable-length deduplication to minimize disk requirements, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain® provides the capability to consolidate both backup and archive data on the same infrastructure, thereby eliminating silos of backup and archive storage and associated overhead. Inline write and read verifications protect against and automatically recover from data integrity issues during data ingest and retrieval. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain®. End-to-end data verifications reads data after it is written and compares it to what was sent to disk, proving that it is reachable through the file system to disk and that the data is not corrupted.

The laptop computer 102 may be referred to as a Data Domain® Boost client 102, the personal computer 104 may be referred to as a common internet file system client 104, the Apple® Macintosh computer 106 may be referred to as a network file system client 106, the first server 108 may be referred to as a Data Domain® Boost server 108, and the second server 110 may be referred to as an Isilon server 110. EMC Corporation's Data Domain® Boost includes client-side code, which may be implemented as a first client-side component 118 in the first client 102, a second client-side component 120 in the second client 104, a third client-side component 122 in the third client 106. Data Domain® Boost also includes server-side code, which may be implemented as a server-side component 124, which may be in the backup appliance 112. Data Domain® Boost offloads part of a disk array's deduplication process to any combination of the clients 102-106 and the servers 108-110, which prevents the disk array from having to carry the full burden of the deduplication workload.

The client-side components 118-122 take the data object that is being backed up, segment the data object, compare the segmented data object with data segments already stored by the servers 108-110, and send only new data segments over the network 114 to the servers 108-110. Therefore, a large part of the deduplication work can take place before the clients 102-106 send the data over the network 114 to the servers 108-110. This distributed deduplication minimizes the data actually sent from the client to the backup server 108, significantly decreasing network bandwidth usage, freeing up resources which result in faster data throughput, and lowering the time to create backup files. Isilon is a scale out network-attached storage platform offered by Dell EMC for high-volume storage, backup, and archiving of unstructured data.

Although the following examples describe the client-side components 118-122 and the server-side component 124 as client-side code and server-side code for EMC Corporation's Data Domain® Boost, the client-side components 118-122 and the server-side component 124 may be any type of client-side code and server-side code. The system 100 may provide client-side modules 126-130 as plug-ins to any of the clients 102-106, and provide a server-side daemon 132 as a plug-in to the servers 108-110 and/or the backup appliance 112 that enables any of the clients 102-106, the servers 108-110 and/or the backup appliance 112 to offload search pattern matching from clients to servers, as described below. By being tightly coupled to the backup appliance 112, and by being provided with configuration details like the local network configuration details, the server-side daemon 132 has access to the internal network (the same virtual local area network or cluster) and file system of the backup appliance 112. The backup/restore application 116 may provide a plug-in to any of the clients 102-106 and/or the servers 108-110 that enables any of the clients 102-106 and/or the servers 108-110 to execute the commands to back up and restore a data object.

Although FIG. 1 depicts the system 100 with three clients 102-106, two servers 108-110, one backup appliance 112, one network 114, one backup/restore application 116, three client-side components 118-122, one server-side component 124, three client-side modules 126-130, and one server-side daemon 132, the system 100 may include any number of clients 102-106, any number of servers 108-110, any number of backup appliances 112, any number of networks 114, any number of backup/restore applications 116, any number of client-side components 118-122, any number of server-side components 124, any number of client-side modules 126-130, and any number of server-side daemons 132. The clients 102-106 and the servers 108-110 may each be substantially similar to the system 300 depicted in FIG. 3 and described below in reference to FIG. 3. FIG. 1 depicts the backup/restore application 116, the server-side component 124, and the server-side daemon 132 residing on the backup appliance 112. However, the backup/restore application 116, the server-side component 124, and the server-side daemon 132 may reside completely on the first server 108, completely on the second server 110, or in any combination of partially on the first server 108, partially on the second server 110, and partially on the clients 102-106.

Even though the following paragraphs describe EMC Corporation's NetWorker® backup/restore application and EMC Corporation's Avamar® backup/restore application as examples of the backup/restore application 116, the backup/restore application 116 may be any other backup/restore application which provides the backup/restore functionalities described in the Background section. The backup/restore application 116 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup/restore application, one of skill in the art would recognize that other backup/restore applications and their corresponding functionalities may be used. The backup/restore application 116 may also be implemented as a NetWorker® Module For Microsoft Applications, which, as stated above, may reside completely on the first server 108, completely on of the second server 110, completely on any of the clients 102-106, or in any combination of partially on the first server 108, partially on the second server 110, and partially on the clients 102-106.

The backup/restore application 116 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup data sends only changed blocks, reducing network traffic.

EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The system 100 can provide any and/or all of the clients 102-106 with corresponding client-side modules 126-130 as Data Domain® Boost plug-ins 126-130 through the process of any of the servers 108-110 downloading the corresponding client-side modules 126-130 to any and/or all of the clients 102-106, or by any other appropriate means and/or method of provision. After being provided, the Data Domain® Boost plug-ins 126-130 may be incorporated in the client-side components 118-122, which may be Data Domain® Boost client-side code 118-122 that offload part of a deduplication process from a disk array to any of the clients 102-106 and/or the servers 108-110. A client can be a computer that is capable of obtaining information and/or applications from a server. A client-side module can be a set of instructions that may be executed by a computer that is capable of obtaining information and/or applications from a server. A server can be a host computer that runs computer programs which share their resources or services with client devices. A client-side component can be a set of instructions that may be executed by a computer that is capable of obtaining information and/or applications from a server. A deduplication process can be actions that eliminate redundant data. A disk array can be a persistent storage mechanism where data is recorded by various electronic, magnetic, optical, or mechanical changes, and which uses cache memory.

Following being provided with a client-side module, the client receives a command that specifies applying a search pattern, which may include a regular expression, to a data object that is stored by a server. For example, and without limitation, this can include the Data Domain® Boost client-side plug-in 122, which the Data Domain® Boost client 102 downloaded from the Data Domain® Boost backup server 108, receiving a grep command to apply the regular expression search pattern "error" to the file file.txt that is stored by the Data Domain® Boost backup server 108. A command can be an instruction to a computer to provide information or perform a function. A search pattern can be a sequence of characters that is used to identify the presence of the constituents of the sequence of characters within another sequence of characters. A data object can be a group of information that may be processed as a unit. A regular expression can be a sequence of characters that define a search pattern.

Having received a command which specifies applying a search pattern to a data object that is stored by a server, the requesting client converts the command into a remote procedure call that specifies applying the search pattern to the data object that is stored by the server. By way of example and without limitation, this can include the Data Domain® Boost client-side plug-in 122 converting the grep command, which specifies applying the regular expression search pattern "error" to the file file.txt that is stored by the Data Domain® Boost backup server 108, into a grep remote procedure call that specifies applying the regular expression search pattern "error" to the file file.txt (by specifying the directory file handle for the file file.txt) that is stored by the Data Domain® Boost backup server 108. Although this example describes converting a single command into a single remote procedure call, any of the client-side modules 126-130 can convert multiple commands into a single remote procedure call. A remote procedure call can be a computer program that causes a subroutine to execute on another computer, and that is coded as if it were a local subroutine.

After the conversion of a command to access a requested server into a remote procedure call, the requesting client can determine whether the requesting client is already connected to the requested server. In embodiments, this can include the Data Domain® Boost client-side plug-in 122 determining whether the Data Domain® Boost client 102 already has a network connection to the Data Domain® Boost backup server 108. If the requesting client is not already connected to the requested server, the requesting client can create a network connection between the requesting client and the requested server. For example, and without limitation, this can include the Data Domain® Boost client-side plug-in 122 creating a network connection between the Data Domain® Boost client 102 and the Data Domain® Boost backup server 108 if the Data Domain® Boost client-side plug-in 122 determined that no network connection already exists between the Data Domain® Boost client 102 and the Data Domain® Boost backup server 108. A network connection can be a link between components in a system.

Following the creation of the network connection at any previous time, the requesting client uses the created network connection between the requesting client and the requested server to send the converted remote procedure call to the requested server. By way of example and without limitation, this can include the Data Domain® Boost client-side plug-in 122 using the created network connection between the Data Domain® Boost client 102 and the Data Domain® Boost backup server 108 to send the grep remote procedure call from the Data Domain® Boost client 102 to the Data Domain® Boost backup server 108.

After the requesting client sends the converted remote procedure call to the requested server, a server-side daemon receives the converted remote procedure call and then reads the requested data object from the requested server. In embodiments, this can include the Data Domain® Boost server-side daemon 132 receiving the grep remote procedure call from the Data Domain® Boost client-side plug-in 122 via the network connection. Whenever resources are available for the Data Domain® Boost backup server 108, the Data Domain® Boost server-side daemon 132 reads the grep remote procedure call that specifies file file.txt and the Data Domain® Boost backup server 108, and synchronously or asynchronously uses the internal cluster network to read the file file.txt from the Data Domain® Boost backup server 108. Although this example describes reading a data object for a single command that was converted into a single remote procedure call, the server-side daemon 132 can read data objects for multiple commands that were converted into a single remote procedure call. A server-side daemon may be incorporated in a server-side component, such as the Data Domain® Boost server-side module 120 that offloads part of a deduplication process from a disk array to any of the clients 102-106 and/or the servers 108-110. A server-side daemon can be a computer program that executes without user intervention in a multi-tasking operating system of a host computer that runs computer programs which share their resources or services with client devices. A server-side component can be a set of instructions that may be executed by a host computer that runs computer programs which share their resources or services with client devices.

Following the local reading of the requested data object that is stored by the requested server, the requested server generates a match result by applying the search pattern to the requested data object. For example, and without limitation, this can include the Data Domain® Boost server-side daemon 132 synchronously or asynchronously generating an error in file.txt match result by applying the regular expression search pattern "error" to the file file.txt. Although this example describes generating a single match result by applying a single search pattern to a single requested data object specified by a single command that was converted into a single remote procedure call, the server-side daemon 132 can generate multiple match results by applying multiple search patterns to multiple requested data objects specified by multiple commands that were converted into a single remote procedure call. A match result can be a set of objects that fulfills the specified conditions of a computer search.

Having generated a match result, the requested server uses the network connection between the requesting client and the requested server to send the match result to the requesting client as a part of a response to the converted remote procedure call. By way of example and without limitation, this can include the Data Domain® Boost daemon 132 synchronously or asynchronously using the network connection between the Data Domain® Boost client 102 and the Data Domain® Boost backup server 108 to send the error in file.txt match result to the Data Domain® Boost client 102 as a part of a response to the grep remote procedure call. A part can be a piece of something such as an object, which combined with other pieces makes up the whole. A response can be a reply to a request. Although this example describes sending a single match result as a single response to a single remote procedure call, the server-side daemon 132 can send multiple match results as multiple responses to a single remote procedure call.

After receiving the part of the response to the converted remote procedure call, the requesting client converts this part of the response into a response, which includes the match result, to the original command. In embodiments, this can include the Data Domain® Boost client-side plug-in 122 receiving the error in file.txt match result as an error in file.txt response to the grep remote procedure call from the Data Domain® Boost server-side daemon 132 over the network connection, and then converting the error in file.txt response to the grep remote procedure call into an error in file.txt response to the grep command to apply the regular expression search pattern "error" to the file file.txt that is stored by the Data Domain® Boost backup server 108. Although this example describes converting a single response to a single remote procedure call into a single response to a single command, any of the client-side modules 126-130 can convert a single response to a single remote procedure call into multiple responses to multiple commands. By converting a user's command into a remote procedure call and then converting the response to the remote procedure call into a response to the user's command, the offloading of the search pattern matching to the server is transparent for the user, and the user can continue entering the same commands as before, without having to learn any new commands or any variations of the existing commands.

Figure 2:
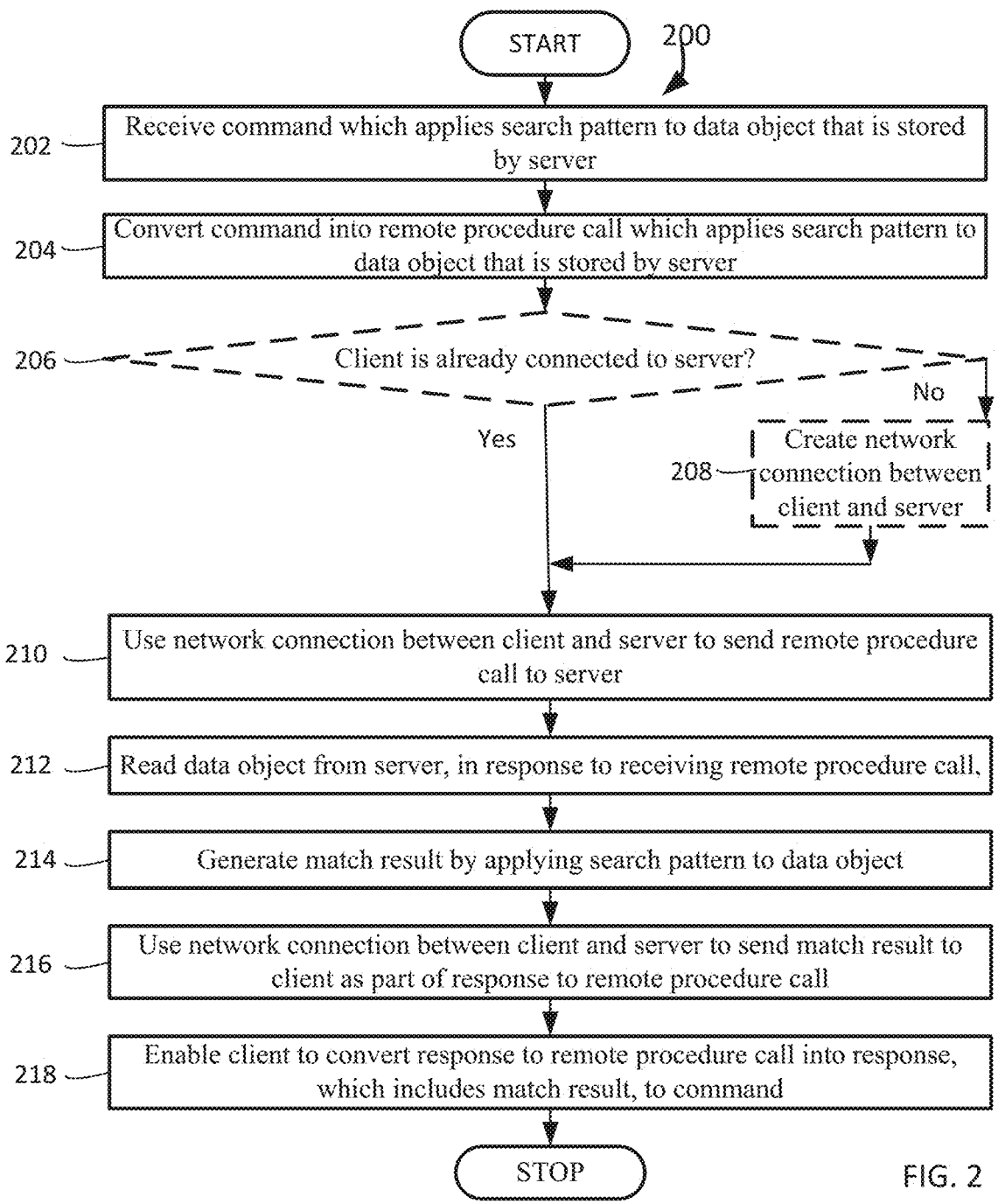
FIG. 2 is a flowchart that illustrates a method for remote procedure calls that offload search pattern matching from clients to servers, under an embodiment.

FIG. 2 is a flowchart that illustrates a method for remote procedure calls that offload search pattern matching from clients to servers, under an embodiment. Flowchart 200 illustrates method acts illustrated as flowchart blocks for certain steps involved in and/or between the clients 102-106 and/or the servers 108-110 of FIG. 1.

A command, which specifies applying a search pattern to a data object that is stored by a server, is received by a client, block 202. The system receives access commands that will be converted to remote procedure calls. For example, and without limitation, this can include the Data Domain® Boost client-side plug-in 122, which the Data Domain® Boost client 102 downloaded from the Data Domain® Boost backup server 108, receiving a grep command to apply the regular expression search pattern "error" to the file file.txt that is stored by the Data Domain® Boost backup server 108.

After receiving a command which specifies applying a search pattern to a data object that is stored by a server, the command is converted by the client into a remote procedure call that specifies applying the search pattern to the data object that is stored by the server, block 204. The system converts access commands into remote procedure calls. By way of example and without limitation, this can include the Data Domain® Boost client-side plug-in 122 converting the grep command, which specifies applying the regular expression search pattern "error" to the file file.txt that is stored by the Data Domain® Boost backup server 108, into a grep remote procedure call that specifies applying the regular expression search pattern "error" to the file file.txt that is stored by the Data Domain® Boost backup server 108.

Following a client's conversion of a command to access a server into a remote procedure call, a determination is optionally made whether the client is already connected to the server, block 206. The system determines whether a requesting client already has a network connection to a requested server. In embodiments, this can include the Data Domain® Boost client-side plug-in 122 determining whether the Data Domain® Boost client 102 already has a network connection to the Data Domain® Boost backup server 108. If the client is not already connected to the server, the method 200 continues to block 208 to create the network connection. If the client is already connected to the server, the method 200 proceeds to block 210 to use the already existing network connection.

If the client is not already connected to the server, a network connection is optionally created between the client and the server, block 208. The system creates network connections between requesting clients and requested servers, as needed. For example, and without limitation, this can include the Data Domain® Boost client-side plug-in 122 creating a network connection between the Data Domain® Boost client 102 and the Data Domain® Boost backup server 108.

Having been created at any previous time, a network connection between the client and the server is used to send the remote procedure call to the server, block 210. The system sends the converted remote procedure call to the requested server. By way of example and without limitation, this can include the Data Domain® Boost client-side plug-in 122 using the network connection between the Data Domain® Boost client 102 and the Data Domain® Boost backup server 108 to send the grep remote procedure call from the Data Domain® Boost client 102 to the Data Domain® Boost backup server 108.

After the client sends the remote procedure call to the server, the data object is read from the server, in response to receiving the remote procedure call, block 212. The system reads the requested data object local to the requested server. In embodiments, this can include the Data Domain® Boost server-side daemon 132 receiving the grep remote procedure call from the Data Domain® Boost client-side plug-in 122 over the network connection, and then reading the file file.txt from the Data Domain® Boost backup server 108.

Following the reading of the data object that is stored by the server, a match result is generated by applying a search pattern to the data object, block 214. The system applies the regular expression search pattern locally on the requested server. For example, and without limitation, this can include the Data Domain® Boost server-side daemon 132 generating an error in file.txt match result by applying the regular expression search pattern "error" to the file file.txt.

Having generated a match result, the network connection between the client and the server is used to send the match result to the client as a part of a response to the remote procedure call, block 216. The system sends the result of the regular expression search pattern matching, which was offloaded to the requested server, to the requesting client. By way of example and without limitation, this can include the Data Domain® Boost server-side daemon 132 using the network connection between the Data Domain® Boost client 102 and the Data Domain® Boost backup server 108 to send the error in file.txt match result to the Data Domain® Boost client 102 as a part of a response to the grep remote procedure call.

After receiving the response to the remote procedure call, this response is converted into a response, which comprises the match result, to the command, block 218. The system converts the result of the offloaded regular expression search pattern matching into an access command response. In embodiments, this can include the Data Domain® Boost client-side plug-in 122 receiving the error in file.txt match result as an error in file.txt response to the grep remote procedure call from the Data Domain® Boost server-side daemon 124 over the network connection, and then converting the error in file.txt response to the grep remote procedure call into an error in file.txt response to the grep command to apply the regular expression search pattern "error" to the file file.txt that is stored by the Data Domain® Boost backup server 108.

Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different set of blocks.

Figure 3:
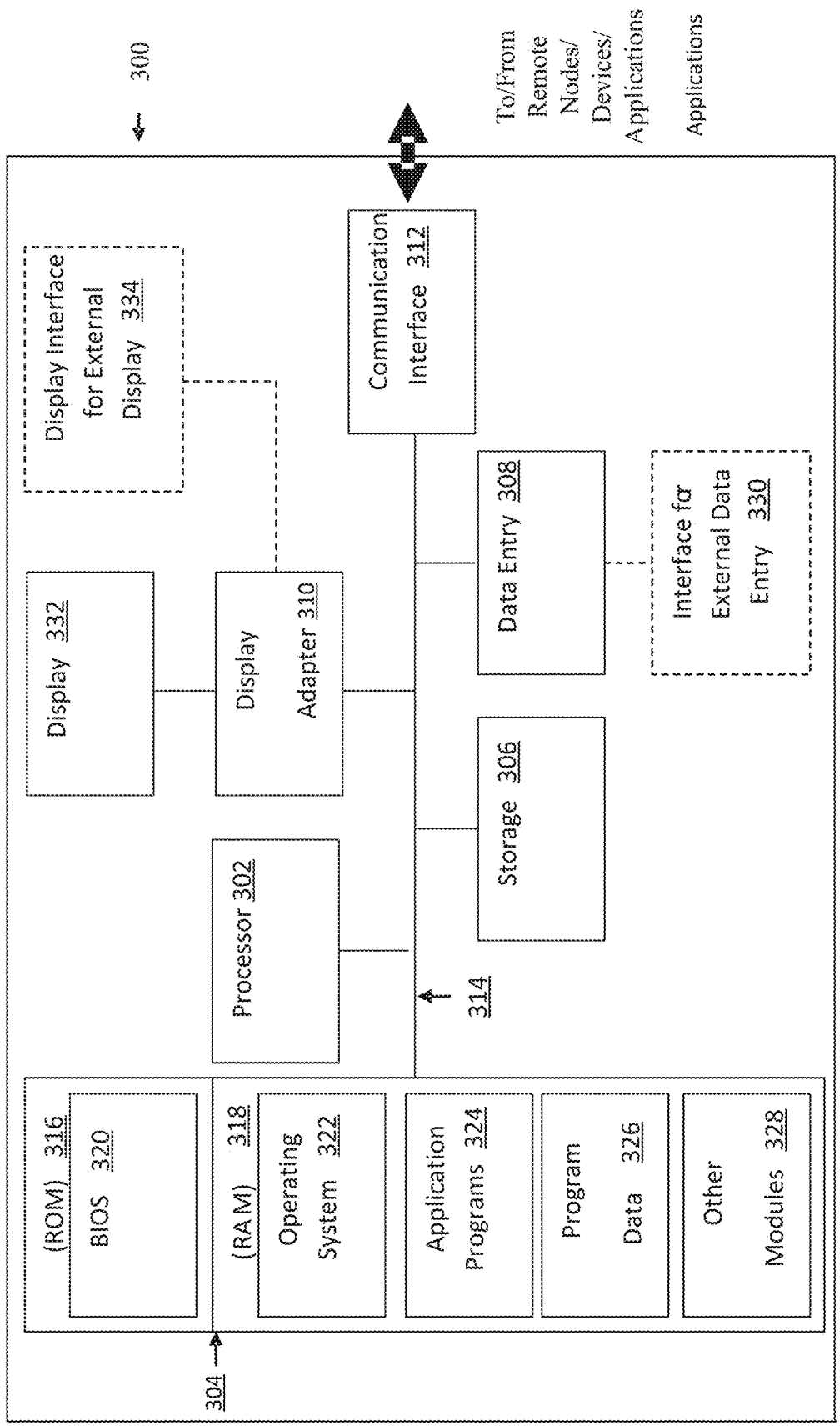
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, data entry module 308, display adapter 310, communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in memory 304 and/or storage 306 and/or received via data entry module 308.

The memory 304 may include read only memory (ROM) 316 and random access memory (RAM) 318. Memory 304 may be configured to store program instructions and data during operation of device 300. In various embodiments, memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 304 may also include nonvolatile memory technologies such as nonvolatile flash RAM (NVRAM) or ROM. In some embodiments, it is contemplated that memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, ROM 316 or RAM 318, including an operating system 322, one or more applications programs 324, program data 326, and other program modules 328. A user may enter commands and information into the hardware device 300 through data entry module 308. Data entry module 308 may include mechanisms such as a keyboard, a touch screen, a pointing device, etc. Other external input devices (not shown) are connected to the hardware device 300 via external data entry interface 330. By way of example and not limitation, external input devices may include a microphone, joystick, game pad, satellite dish, scanner, or the like. In some embodiments, external input devices may include video or audio input devices such as a video camera, a still camera, etc. Data entry module 308 may be configured to receive input from one or more users of device 300 and to deliver such input to processing unit 302 and/or memory 304 via bus 314.

A display 332 is also connected to the bus 314 via display adapter 310. Display 332 may be configured to display output of device 300 to one or more users. In some embodiments, a given device such as a touch screen, for example, may function as both data entry module 308 and display 332. External display devices may also be connected to the bus 314 via external display interface 334. Other peripheral output devices, not shown, such as speakers and printers, may be connected to the hardware device 300.

The hardware device 300 may operate in a networked environment using logical connections to one or more remote nodes (not shown) via communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 312 may include logic configured to support direct memory access (DMA) transfers between memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for remote procedure calls that offload search pattern matching from clients to servers, comprising:
   one or more processors; and
   a non-transitory computer readable medium storing a plurality of instructions, which when executed, cause the one or more processors to:
      receive, by a client side module, a command specifying a search pattern, a data object stored by a server, and application of the search pattern to the data object;
      convert, by the client side module, the command into a remote procedure call and use a network connection between the client and the server to send the remote procedure call to the server in response to receiving the command specifying application of the search pattern to the data object, wherein the remote procedure call specifies the search pattern, the data object, and application of the search pattern to the data object;
      read, by a server side daemon, the data object specified in the remote procedure call from the server;
      generate, by the server side daemon, a match result by applying the search pattern specified in the remote procedure call to the data object read by the server side daemon; and
      use, by the server side daemon, the network connection between the client and the server to send the match result to the client as a part of a response to the remote procedure call, thereby enabling the client side module to convert the response to the remote procedure call into a response to the command, which comprises the match result.

2. The system of claim 1, wherein enabling the client to convert the command into the remote procedure call and use the network connection to send the remote procedure call to the server comprises providing the client with the client-side module that converts the command into the remote procedure call and uses the network connection to send the remote procedure call to the server.

3. The system of claim 2, wherein the client-side module is incorporated in a client-side component that offloads part of a deduplication process from a disk array to the client and/or the server.

4. The system of claim 1, wherein the search pattern comprises a regular expression and the server comprises a network access server.

5. The system of claim 1, wherein using the network connection between the client and the server to send the remote procedure call to the server comprises determining whether the client is already connected to the server, and creating the network connection between the client and the server in response to a determination that the client is not already connected to the server.

6. The system of claim 1, wherein the server-side daemon is incorporated in a server-side component that offloads part of a deduplication process from a disk array to the client and/or the server.

7. A computer-implemented method for remote procedure calls that offload search pattern matching from clients to servers, comprising:
   receiving, by a client side module, a command specifying a search pattern, a data object stored by a server, and application of the search pattern to the data object;
   converting, by the client side module, the command into a remote procedure call and use a network connection between the client and the server to send the remote procedure call to the server in response to receiving the command specifying application of the search pattern to the data object, wherein the remote procedure call specifies the search pattern, the data object, and application of the search pattern to the data object;

reading, by a server side daemon, the data object specified in the remote procedure call from the server;

generating, by the server side daemon, a match result by applying the search pattern specified in the remote procedure call to the data object read by the server side daemon; and using, by the server side daemon, the network connection between the client and the server to send the match result to the client as a part of a response to the remote procedure call, thereby enabling the client side module to convert the response to the remote procedure call into a response to the command, which comprises the match result.

8. The computer-implemented method of claim 7, wherein enabling the client to convert the command into the remote procedure call and use the network connection to send the remote procedure call to the server comprises providing the client with the client-side module that converts the command into the remote procedure call and uses the network connection to send the remote procedure call to the server.

9. The computer-implemented method of claim 8, wherein the client-side module is incorporated in a client-side component that offloads part of a deduplication process from a disk array to the client and/or the server.

10. The computer-implemented method of claim 7, wherein the search pattern comprises a regular expression and the server comprises a network access server.

11. The computer-implemented method of claim 7, wherein using the network connection between the client and the server to send the remote procedure call to the server comprises determining whether the client is already connected to the server, and creating the network connection between the client and the server in response to a determination that the client is not already connected to the server.

12. The method of claim 7, wherein the server-side daemon is incorporated in a server-side component that offloads part of a deduplication process from a disk array to the client and/or the server.

13. A computer program product, comprising a non-transitory computer-readable medium having a computer-readable program code embodied therein to be executed by one or more processors, the program code including instructions to:

receive, by a client side module, a command specifying a search pattern, a data object stored by a server, and application of the search pattern to the data object;

convert, by the client side module, the command into a remote procedure call and use a network connection between the client and the server to send the remote procedure call to the server in response to receiving the command specifying application of the search pattern to the data object, wherein the remote procedure call specifies the search pattern, the data object, and application of the search pattern to the data object;

read, by a server side daemon, the data object specified in the remote procedure call from the server;

generate, by the server side daemon, a match result by applying the search pattern specified in the remote procedure call to the data object read by the server side daemon; and use, by the server side daemon, the network connection between the client and the server to send the match result to the client as a part of a response to the remote procedure call, thereby enabling the client side module to convert the response to the remote procedure call into a response to the command, which comprises the match result.

14. The computer program product of claim 13, wherein enabling the client to convert the command into the remote procedure call and use the network connection to send the remote procedure call to the server comprises providing the client with the client-side module that converts the command into the remote procedure call and uses the network connection to send the remote procedure call to the server.

15. The computer program product of claim 14, wherein the client-side module is incorporated in a client-side component that offloads part of a deduplication process from a disk array to the client and/or the server.

16. The computer program product of claim 13, wherein the search pattern comprises a regular expression and the server comprises a network access server.

17. The computer program product of claim 13, wherein using the network connection between the client and the server to send the remote procedure call to the server comprises determining whether the client is already connected to the server, and creating the network connection between the client and the server in response to a determination that the client is not already connected to the server.

18. The computer program product of claim 13, wherein the server-side daemon is incorporated in a server-side component that offloads part of a deduplication process from a disk array to the client and/or the server.

* * * * *